J. H. CRAIG.
CORN PLANTER.
APPLICATION FILED SEPT. 18, 1915.
1,183,346.
Patented May 16, 1916.
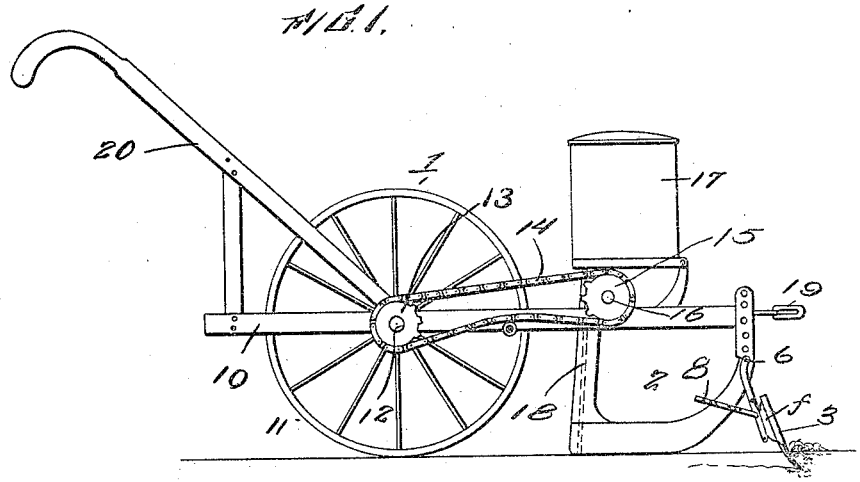
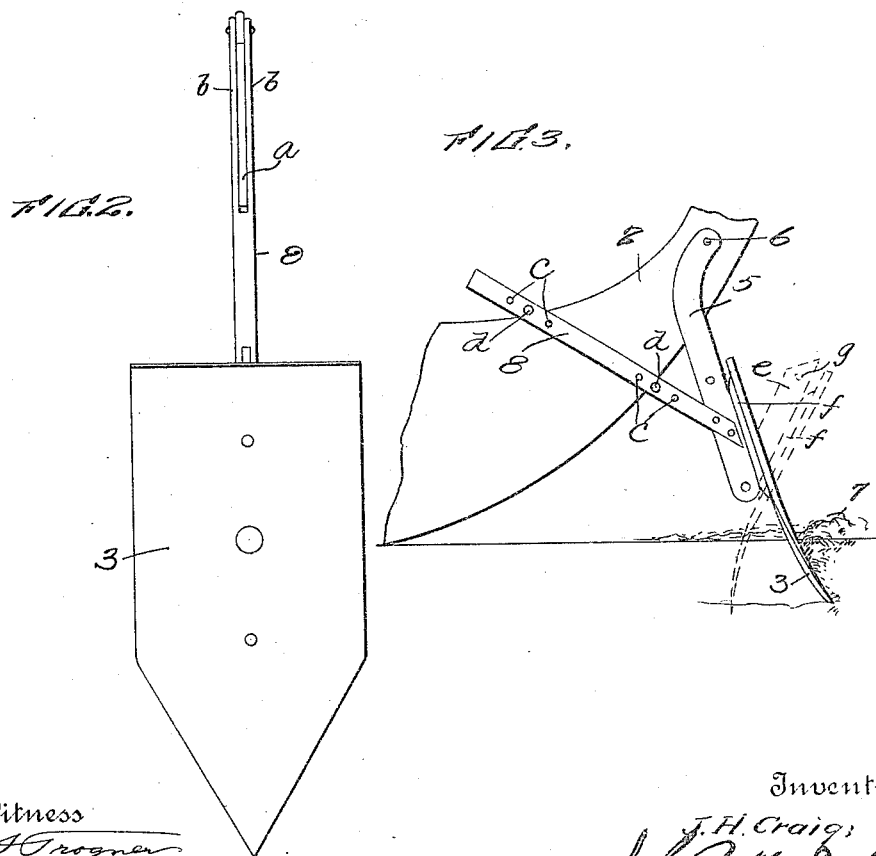

UNITED STATES PATENT OFFICE.

JOHN H. CRAIG, OF WEBSTER CITY, IOWA.

CORN-PLANTER.

1,183,346.   Specification of Letters Patent.   Patented May 16, 1916.

Application filed September 18, 1915. Serial No. 51,493.

*To all whom it may concern:*

Be it known that I, JOHN H. CRAIG, a citizen of the United States, residing at Webster City, in the county of Hamilton and State of Iowa, have invented certain new and useful Improvements in Corn-Planters, of which the following is a specification.

This invention relates to improvements in corn planters, generally, more particularly attachments therefor at the runner end of the planter.

The invention has for its object to provide for lightening the draft and simultaneously removing the trash or any obstruction in the path of the planter runner or plow.

A further object is to provide for carrying out the aforesaid ends in a simple, expeditious and effective manner, and with facility.

The invention therefore consists of certain instrumentalities and features of construction substantially as hereinafter described and defined by the appended claims.

In the accompanying drawing is illustrated the preferred embodiment of my invention, wherein it will be understood that various changes and modifications may be made as relates to the detailed construction and arrangement of parts without departing from the scope of the claims and in which drawing—

Figure 1 is a side elevation of my invention with parts broken away. Fig. 2 is an enlarged detached view of the furrow opener or shovel. Fig. 3 is an enlarged detailed view of the invention, parts being broken away, and the furrow opener or shovel shown in excavating position in full lines and in dotted lines, and in yielding or inoperative position.

In carrying out my invention, I provide in connection with the corn-planter of general construction 1, having the usual runner or shoe 2, a shovel or furrow opener 3, which, itself, may be of any preferred construction, as disclosed particularly in Fig. 3. The furrow opener or shovel 3 has breakable or yieldable connection by means of a pin, as 4, with the suspender or pendant 5 pivotally connected, as at 6, to the shoe 2, at a suitable distance above the ground surface, whereby, it is apparent, with the shovel or furrow opener in its excavating position in event of contact with an obstruction, as for instance, at 7, Fig. 3, the shovel or furrow opener will readily yield to the dotted line position, and thus provide against the breakage of the furrow opener or shovel. It is obvious that, after the passage of the obstruction or at the obstruction, the furrow opener or shovel may be returned to its normal or operative position. The suspender or pendant 5 may be adjusted either forwardly or backwardly to regulate the working angle of the furrow opener or shovel 3 by means of the rearwardly extending upwardly inclined brace bar 8, the upper or outer portion of which is bifurcated or slotted longitudinally, as at $a$, as shown more particularly in Fig. 2, forming the laterally spaced forks or side members $b$, which receive or straddle the front end of the runner and are provided with upper and lower series of transverse registering apertures $c$ adapted to receive the headed pins or bolts $d$ arranged to engage the upper and lower edges of the runner or shoe 2 of the planter, as shown in Figs. 1 and 3.

The upper end of the suspender or pendant 5 is slotted or bifurcated to receive the runner as indicated, while the lower end thereof is also slotted longitudinally to receive a longitudinal web or flange $e$ formed on an enlargement or shoulder $f$ on the rear face of the furrow opener or shovel whereby the latter is pivotally secured at the lower end of said web or flange to the suspender 5. The upper end of the web or flange $e$ is provided with an opening $g$ adapted to receive the pin 4 whereby a breakable or yieldable connection is provided between the upper end of the furrow opener or shovel and the suspender or pendant 5, for the purpose specified. It will be understood of course, that the pin is of wood or other suitable material capable of holding the furrow opener or shovel in working position under normal conditions, but which will break and allow the shovel to turn on its pivot to the dotted line position indicated in Fig. 3 should the latter engage a serious obstruction.

As above stated, the corn planter generally comprises a frame 10 suitably mounted upon carrying wheels 11 whose axle 12, which is suitably connected to said frame so as to turn therein, is provided with a pinion 13 of the sprocket type which drives a link belt similarly engaging a second sprocket pinion 15 on the seed dropping shaft 16 suitably journaled beneath the seed hopper 17 and so as to suitably drop the seed contained in the latter into the leg 18 of the shoe 2, as in effecting the seed or corn-planting operation.

Suitable means, as at 19, is provided for the application of the draft to the planter frame 10, said frame also being equipped with the usual handles 20 for suitably guiding the machine.

I claim—

1. An attachment for corn planters comprising a furrow opener or shovel arranged in front of the runner or plow of the planter, a suspender or pendant pivoted to the planter runner and an upwardly inclined rearwardly extending brace connected with the lower or free end of the suspender and slidably receiving the runner to adjust the furrow opener either forwardly or backwardly in the arc of a circle to vary its working angle and cutting depth.

2. An attachment for corn planters comprising a suspender or pendant pivoted to the front end of the runner of the planter, a furrow opener or shovel pivoted to the lower end of said suspender or pendant and an upwardly inclined brace bar having its upper end slotted longitudinally to receive the planter runner with its lower end connected with that of the suspender, said brace bar comprising the principal means of adjusting the suspender and furrow opener or shovel either forwardly or backwardly in the arc of a circle to vary the working angle and cutting depth of the latter.

3. An attachment for corn planters comprising a suspender pivoted to the planter runner, a furrow opener or shovel pivoted to the lower end of the suspender, and means for adjusting the lower end of said suspender and said furrow opener or shovel, either forwardly or backwardly in the arc of a circle to vary the working angle and cutting depth of the latter, said means comprising an upwardly inclined rearwardly extending brace bar connected at its forward or lower end with the suspender and having a longitudinally slotted or forked upper end provided with series of transverse coincident apertures or openings adapted to receive headed pins or apertures arranged to engage the upper and lower edges of the runner for the purpose specified.

4. An attachment for corn planters comprising a suspender pivoted at its upper end to the front end of the runner and having a bifurcated or longitudinally slotted lower end, a furrow opener or runner provided on its rear face with a shoulder having a longitudinal flange or web, said shoulder adapted to fit against the front edge of the lower slotted portion of said suspender and said flange or web fitting in the slot thereof, the furrow opener or shovel being pivoted at the lower end of its flange or web to the lower end of the suspender, a pin extending through the lower slotted end of the suspender and the upper end of said flange or web to provide a breakable or yieldable connection between the suspender and upper end of the furrow opener, and means comprising an inclined brace bar slidably engaging the front end of the runner for adjusting the lower end of said suspender and the furrow opener, either forwardly or backwardly in the arc of a circle to vary the working angle and cutting depth of the latter.

In testimony whereof I affix my signature in the presence of two witnesses.

JOHN H. CRAIG.

Witnesses:
 FOREST F. HALL,
 G. F. TUCKER.